United States Patent [19]

Arkles

[11] Patent Number: 4,626,583
[45] Date of Patent: Dec. 2, 1986

[54] POLYSILANE-SILOXANE OLIGOMERS AND COPOLYMERS AND METHODS OF MAKING THE SAME

[75] Inventor: Barry C. Arkles, Ambler, Pa.

[73] Assignee: Petrarch Systems Inc., Bristol, Pa.

[21] Appl. No.: 754,093

[22] Filed: Jul. 11, 1985

[51] Int. Cl.⁴ .............................................. C08G 77/04
[52] U.S. Cl. ....................................... 528/34; 528/33; 528/25; 525/477; 556/430
[58] Field of Search .................... 556/430; 528/33, 34, 528/25; 525/477

[56] References Cited

U.S. PATENT DOCUMENTS 2,881,197  4/1959  Kuriyagawa et al. ............... 556/430
4,310,481  1/1982  Baney .................................. 556/430

FOREIGN PATENT DOCUMENTS 675912  7/1952  United Kingdom .
689648  4/1953  United Kingdom .

OTHER PUBLICATIONS

R. West et al., J. Amer. Chem. Soc., 103 (1981) 7352.

Primary Examiner—Melvyn I. Marquis
Attorney, Agent, or Firm—Panitch Schwarze Jacobs & Nadel

[57] ABSTRACT

Linear polysilane-siloxane copolymers having remarkable sensitivity to radiation have the general formula

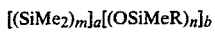

$[(SiMe_2)_m]_a[(OSiMeR)_n]_b$ wherein Me is a methyl group, R is lower alkyl or phenyl, m=4 to about 30 inclusive, n=1 to about 100 inclusive, a and b may each be 1 to about 10 inclusive, and a units alternate with b units. The copolymers of the invention may be in the form of oligomers, random copolymers where n=1 to 9, block copolymers where n=10 to 100, and mixed (random and block) copolymers. These copolymers may also be in the form of modified copolymers having reactive functional groups such as acrylate, methacrylate, vinyl or other unsaturated substitutions. The copolymers may be produced by formation of a halogen terminated oligomer of a polysilane or polysilane-siloxane copolymer, followed by coupling the oligomers with themselves or with distinct higher molecular weight silanol terminated siloxane species. Depending upon their specific structures, the copolymers respond to electron beam or ultraviolet radiation by depolymerizing, behaving as photoinitiators for acrylate polymerization or cross-linking.

18 Claims, No Drawings

POLYSILANE-SILOXANE OLIGOMERS AND COPOLYMERS AND METHODS OF MAKING THE SAME

The present invention relates to the production of oligomers and copolymers of siloxanes with polysilanes, particularly poly(dimethylsilane). More particularly, the invention relates to halogen terminated oligomers, and random, block, mixed (random and block), and modified block copolymers which exhibit unique optical and photosensitive properties.

BACKGROUND OF THE INVENTION

Polysilanes are of interest because of several unusual properties associated with repeating silicon-silicon bonds which exhibit extensive electron delocalization. This unusual delocalization is associated directly or indirectly with high refractive index, high extinction coefficients of absorption at ultraviolet light frequencies, and olefin-like behavior.

Polymeric phenylsilanes were apparently obtained by Kipping early in this century, and permethylpolysilane, also known as poly(dimethylsilane), was prepared as early as 1949 by the sodium condensation of $Me_2SiCl_2$, wherein Me signifies a methyl ($CH_3$) group. However, no noteworthy applications exploiting optical or photosensitive properties of these materials have emerged. This is a consequence of the intractable nature of high molecular weight silane polymers which exhibit little or no solubility in the usual organic solvents such as benzene, toluene, xylene, and naphtha petroleum thinners.

Several approaches have been followed to modify the polymer structure so as to circumvent the problem of intractability. Perhaps the most well known is the polysilane derived by Wurtz-Fittig condensation of one to two mole ratios of phenylmethyldichlorosilane and dimethyldichlorosilane, which results in the introduction of a phenyl group in place of a methyl group on alternating silicon atoms. Crystallinity drops sharply with increasing numbers of phenyl groups. At phenyl/methyl ratios near 1:3 the polymer is amorphous, with a melting temperature near 200 degrees C., and is highly soluble in organic solvents at room temperature. This compound entitled "polysilastyrene" was reported by Robert West et al, *Journal of the American Chemical Society*, 103:7352 (1981).

Other attempts to circumvent the problem of intractability have included the replacement of methyl groups with other hydrocarbon moieties, such as ethyl or n-propyl groups. While all of these substitutions solve to various degrees the problems of solubility, they increase the ratio of hydrocarbon to silicon, and thereby significantly alter optical and thermal characteristics of the polysilanes.

BRIEF SUMMARY OF THE INVENTION

According to the present invention, linear copolymers of silanes and siloxanes have been developed having the basic general formula:

wherein Me is a methyl group, R is lower alkyl or aryl, m=4 to about 30 inclusive, n=1 to about 100 inclusive, a and b may each be 1 to about 10, and a units alternate with b units. The copolymers of the invention may be in the form of oligomers, random (microblock) copolymers where n=1 to 9, block (macroblock) copolymers where n=10 to 100 and mixed (random and block) copolymers.

Also within the invention are modified copolymers of the general formula:

wherein Me, m, n, a and b are as defined above, and R' alternates between lower alkyl or aryl on some Si atoms and a reactive group on other Si atoms wherein the reactive group is selected from acrylate, methacrylate, vinyl, and other unsaturated functional groups.

The invention also comprises methods of preparing the above copolymers. A unique aspect of the methods of the present inventors is the sequential formation of high molecular weight copolymers by first forming oligomers and then coupling oligomers. Generally, the oligomers are prepared by condensing a halogenated disiloxane with a dihalosilane by lithium condensation, while high molecular weight silane-siloxane copolymers are prepared by condensing halogen terminated oligomers with sodium. In other words, Si—O (siloxane) bonds or linkages can be introduced into polysilane chains by condensation with lithium, or polysilanes may be endcapped with polysiloxanes.

The polysilane-siloxane copolymers of the invention exhibit unique optical and photosensitive properties which may be utilized in photoreactive compositions, processes and applications.

DETAILED DESCRIPTION OF PREFERRED EMBODIMENTS

The polysilane-siloxane copolymers (a term which will be used generically herein to include oligomers, random copolymers, block copolymers, mixed copolymers, or modified copolymers) are formed from blocks of 4 to 30 silicon-silicon (Si—Si or silane) bond interrupted by 1 to 100 silicon-oxygen (siloxane) bonds. It is an important part of this invention that there be at least 4 (on the average stoichiometrically) sequential Si—Si bonds before interruption with a siloxane bond.

If a and b in formulas I and II above alternate randomly with n=1-9, the copolymer is referred to as a random or microblock copolymer. In such copolymers there is essentially homogeneous behavior (i.e., a mixture of silane and siloxane properties) and the copolymers are not soluble in silicone solvents but only THF and other polar solvents. If there are 10 or more Si—O linkages in a row (i.e., n=10 to about 100), the copolymers are referred to as block or macroblock copolymers. Such copolymers tend to have more of the properties of siloxanes (silicone or siloxane-type behavior) such as being soluble in hexamethyldisiloxane and other silicone solvents.

It should be understood that the cutoff between microblock (n=1-9) and macroblock (n=10-100) copolymers is somewhat arbitrary and was selected as the approximate point where there is a break in properties between homogeneous and siloxane-type behavior and also where the method of synthesis changes (macroblock copolymers being put together by coupling, such as coupling chlorine or silanol terminated oligomers with polysiloxane oligomers). As practical matter, the break point could be as low as about 6 or 7.

Mixed random and block copolymers are also part of this invention. For example, the polysilane rich portion of the polymer may be interrupted randomly every 4–30 units by a siloxane linkage and then make a transition to a siloxane portion with 10 to 100 consecutive siloxane bonds. Hypothetical examples can be depicted as follows:

random: AAAAABAAAABAAAAAAAB-BAAAAAA
block: AAAAAABBBBBBBBBBBBAAAAAAA
mixed: AAAABAAAAAA-BAAAABBBBBBBBBBBBAAAABAAAA The basic general formula for the polysilane-siloxane copolymers of the present invention may be represented by formula I above, which is highly simplified. The symbol Me as used herein will represent a methyl ($CH_3$) group. R is preferably lower alkyl (usually methyl) or aryl (usually phenyl), although it will be understood by those skilled in the art that other organic groups could be substituted. However, as noted above, since higher ratios of hydrocarbon to silicon significantly alter optical and thermal characteristics of the compounds, it is generally desirable to keep the R groups small.

In formula I the dashes at each end of the formula indicate bonds to unspecified terminal groups for the copolymers. Usually, these are halogen or hydroxyl groups due to the nature of the usual reactants in silane and siloxane chemistry, but other terminal groups are possible, particularly when forming the modified copolymers discussed below.

The copolymers of the invention are linear polymers as distinguished from branched or cross-linked resin materials such as the polysilane-siloxane materials of British patent specifications Nos. 675,921 and 689,648, which are produced by the introduction of monomers with three hydrolyzable groups. The silane units in the copolymer are in blocks of at least 4 units each, so that together with a silicon atom from an adjoining siloxane unit, there are at least 4 sequential Si—Si bonds before interruption with a siloxane bond. Preferably, there are 4 to 30 consecutive silane units although larger numbers of silane units are possible.

The subscript n designates the number of consecutive siloxane units and preferably ranges from 1 to 100, although higher numbers of siloxane units may be included. Where random copolymers are formed, 1–9 units interrupt blocks of at least 4 silane units. Where block copolymers are formed, siloxane blocks of about 10 to 100 units each interrupt blocks (chains) of at least 4 silane units.

The number of continuous (uninterrupted) silane chains and siloxane chains (or units) has no definite upper limit, although generally a and b will not be greater than about 10 each. Hence, the total number of silane units in a copolymer will be (m times a) and the total number of siloxane units will be (n times b). Of course, as illustrated by the hypothetical examples above, m and n may change throughout the polymer chain.

Refractive index is a good measure of the number of silane units versus the number of siloxane units since the refractive index of siloxanes is very low and the refractive index of silanes is very high. The copolymers of the invention may be designated by silane-siloxane content. For example, the copolymer of Example 2 below may be designated (90%) dimethylsilane-(10%)dimethylsiloxane copolymer.

Additional monomers can be incorporated into the copolymers of the present invention to modify them in specific ways. For example, acrylate functional pendant groups may be incorporated into the polysilane-siloxane copolymers of the invention. Such modified polysilane-siloxane copolymers may be represented by the general formula II above which is greatly simplified.

In this formula II, R' may be the same as R in formula I, but on alternate Si atoms in any chain of siloxane units R' groups may be reactive groups selected from acrylate, methyacrylate and other unsaturated substitutions, particularly vinyl.

The copolymers of the present invention exhibit unique optical and photosensitive properties and can be prepared in liquid or solid forms which are soluble in a variety of usual organic solvents. In particular, the silane-siloxane copolymers show remarkable sensitivity to radiation. Depending upon their specific structures and formulations, they respond to electron beam or ultraviolet radiation by depolymerizing, behaving as photointiators for acrylate polymerization or cross-linking. Examples 4 and 8 below are illustrative of the photoactivity of the copolymers of the invention in acting as initiators for acrylate polymerization.

The general methods of synthesis for the copolymers according to the present invention involve the formation of a halogen terminated oligomer of a polysilane or polysilane-siloxane copolymer, followed by coupling of the oligomers with themselves or with distinct high molecular weight silanol terminated siloxane species. The methods of synthesis may be illustrated by the following equations and formulas which are greatly simplified for ease of understanding. While chloro compounds are indicated in the equations as an example, it will be understood that other halogenated compounds may be used, although the chloro compounds are by far the most prevalent in the art. Similarly, specific reaction conditions are not described in detail since they are analogous to similar reactions in silicon chemistry which will be apparent to those of ordinary skill in the art. Specific reaction conditions for the preparation of specific polymer species may be determined by one skilled in the art based upon the specific examples set forth below with only routine additional experimentation.

Whether the copolymers of the invention are solids or liquids depends on a number of factors, including (in relative order of importance) the number of Si—Si bonds (these are "stiff" links which favor solids), the substitution of the R groups (e.g., phenyl favors solid), and the overall degree of polymerization (DP). The DP is not easily controlled, but the use of sodium coupling leads to a higher DP.

Polysilane-siloxane oligomers may be prepared by condensing a halogenated disiloxane with a dihalosilane by lithium condensation. Generally, this reaction is carried out at room temperature by adding the reactants to a dispersion of the lithium metal in an organic solvent such as tetrahydrofuran (THF). The liquid oligomer is stripped from the solvent under vacuum. This reaction may be illustrated by the following reaction equation of dimethyldichlorosilane with 1,3-dichlorotetramethyldisiloxane to yield a chlorine terminated permethyl-polysilane-siloxane oligomer:

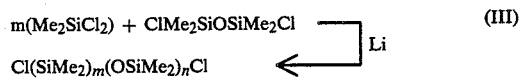

The above polysilane-siloxane oligomer may be used to form random copolymers of the invention by either of two routes, depending upon whether lower or higher molecular weight copolymers are desired. Lower molecular weight copolymers (x≦about 10) may be formed by condensing a halogen terminated polysilane-siloxane oligomer by sodium condensation, as represented by the following reaction equation:

(IV)

Where a higher molecular weight random copolymer (x>about 10) is desired, the oligomer may be hydrolyzed, as illustrated by the following reaction equation:

(V)

As an extension of the latter hydrolysis reaction, the halogen terminated polysilane-siloxane oligomer may be reacted with a silanol terminated organofunctional siloxane and a halogenated organofunctional silane to yield modified polysilane-siloxane copolymers such as acrylate or methacrylate modified copolymers. These are preferably block copolymers with the siloxane preferably being silanol terminated polydimethyl-siloxane. This method is illustrated by the following reaction equation of chlorine terminated polysilane-siloxane oligomer with silanol terminated polydimethylsiloxane and a reactive functional methyldichlorosilane:

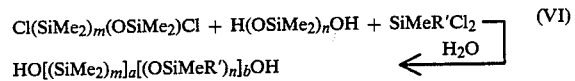
(VI)

Alterntively, the copolymers may be derived from halogen terminated permethylsilane oligomers which may be formed by either of two routes. One route involves the chlorination of a cyclic permethylsilane, as illustrated by the following reaction equation:

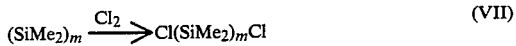
(VII)

The other route involves the lithium condensation of a dimethyldihalosilane, such as illustrated by the following condensation of dimethyldichlorosilane:

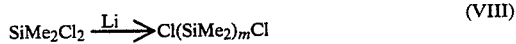
(VIII)

The halogen terminated permethylsilane oligomer may then be hydrolyzed, preferably in saturated sodium bicarbonate solution to yield a hydroxyl terminated polysilane-siloxane random copolymer according to the invention, as illustrated by the following reaction equation:

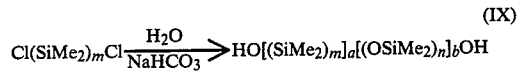
(IX)

If a block copolymer is desired, the hydrolysis is carried out with a silanol terminated organofunctional siloxane such as silanol terminated polydimethylsiloxane, as illustrated in the following reaction equation:

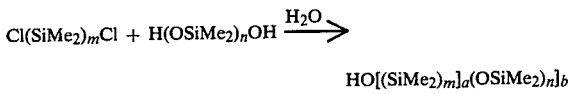

The copolymers, methods and uses of the present invention will now be described in more detail with reference to the following specific, non-limiting examples. Unless otherwise stated refractive index and specific gravity determinations were made at 25 degrees C. Molecular weight determinations were made by GPC styrogel columns (500 Å and 1000 Å porosity), and a correlation factor (1.53) between peak polystryene molecular weight and polysilane molecular weight was applied.

EXAMPLE 1

Preparation of Permethyldecasilane-Disiloxane Oligomer

A 5 liter 4-neck flask was equipped with a glass mechanical stirrer, an addition funnel, a dry-ice condensor and nitrogen purge. It was charged with a dispersion of 31 g (4.5 moles) of lithium metal in 2 liters of tetrahydrofuran (THF). Mechanical agitation was commenced and 40 ml of a total mixture (291 ml) containing 49 ml (0.25 moles) of 1,3-dichlorotetramethyldisiloxane and 242 ml (2 moles) of dimethyldichlorosilane was added. After about 30 minutes a mild exotherm was observed. The mixture wa stirred another 30 mintues. It appeared weakly green in color. Addition was resumed. Color gradually turned purplish then black. The temperature during the addition was 50–65 degrees C. Total addition time for the 291 ml mixture was 5 hours. The solvent layer was decanted from the salts. It was filtered through a Zeta filter pad and stripped under vacuum at 40 degrees C. GPC indicated the material (oligomer) had an average degree of polymerization of 9–18. The oligomer also had a refractive index of 1.495 at 23 degrees C. and a density of 0.89–0.90 at 20 degrees C. The oligomer was chlorine terminated. The low viscosity liquid (oligomer) exhibited UV absorption max. at 230 nm.

EXAMPLE 2

Preparation of Permethyldecasilane-Disiloxane High Polymer

A 250 ml 3-neck flask was charged with 2.3 g of electrolytic sodium beads and 100 mls of toluene. The flask was equipped with Hershberg stirrer, addition funnel and condensor. Sodium dispersion was prepared by heating the mixture to approximately 100 degrees C. while stirring at high speed and allowing the mixture to cool to 60 degrees C. The chlorine terminated oligomer from Example 1 (22.5 g) was added over 30 minutes. The color turned dark purple. The mixture was heated 4–5 hours at 60 degrees C. with stirring. After cooling to room temperature a mixture of approximately 2 ml of water in 25 ml of tetrahydrofuran was added slowly. Slight foaming was observed. The purple color lightened but persisted. 25 ml of water was added and the last trace of purple disappeared. The solvent layer was separated, washed twice with water and then stripped under vacuum. Refractive index of the polymer material was 1.499 at 23 degrees C. and specific gravity was 0.94. The polymer material was a viscous liquid with a freezing point of 18–20 degrees C., and exhibited UV absorption at 240 and 255 nm. GPC indicated a bimodal distribution consisting of a high molecular weight (4500–9000) fraction and a fraction with molecular weight similar to the starting fraction. (M.W. of about 500–1000).

EXAMPLE 3

Preparation of Permethylpentasilane-Disiloxane Polymer

The oligomer of Example 1 was added to an excess of sodium bicarbonate saturated water and stirred 24 hours. The polymer was extracted with hexane, filtered and stripped at 40 degrees C. The refractive index of the compound was 1.491. The material was liquid and did not show signs of freezing until cooled to 10 degrees C. Elemental analysis and comparison of infra-red peak ratios at 1225 and 1235 indicate that the polymer can be nominally described as permethylpentasilane-disiloxane polymer The principal UV absorption was at 235 nm. Molecular weight was about 4500–9000.

EXAMPLE 4

UV initiation with silane-siloxane polymers

An acryloxypropylmethyldimethyldisiloxane copolymer was spread as a film on three glass slides: one as neat copolymer, one with 5% ethylbenzoin dissolved in the copolymer, and one with 5% silanesiloxane polymer of Example 2 dissolved in the copolymer. The three films were exposed under air to a Fusion D 200 watt UV light for 5 seconds. The neat sample showed no cure. The ethyl benzoin and silane-siloxane polymer mixtures photoinitiated polymerization of the respective copolymer films. Acrylate functional siloxanes are susceptible to UV light in the presence of a photoinitiator. This example shows that silane-siloxane copolymers of the present invention photoinitiate in a manner similar to ethyl benzoin, which is a classic photoinitiator.

EXAMPLE 5

Preparation of polypermethylpentadecasilane-disiloxane oligomer

Under the same conditions as described in Example 1 a mixture of 218 mls of dimethyldichlorosilane and 19.6 mls of dichlorotetramethyldisiloxane was added to 27 g of lithium metal dispersion in tetrahydrofuran. The organic fraction was isolated and then stored at 0–10 degrees C. for 48 hours. Crystals of dodecamethylcyclohexasilane precipitated. The mixture was filtered to give a chlorine terminated oligomer. The material had a refractive index of 1.501 at 21 degrees C. Elemental analysis gave a stoichiometry indicating a ratio of approximately 15 Si—Si bonds per Si—O—Si bond. The oligomer showed UV max at 235 and 275 nm. Molecular weight was about 500–1000.

EXAMPLE 6

Preparation of Permethyldecasilane-1,3-Diphenyl-1,3-Dimethyl Disiloxane Oligomer The method of Example 1 was followed exactly with 1,3-dichloro-1,3-diphenyl-1,3-dimethyldisiloxane substituted for 1,3-dichlorotetramethyldisiloxane. The reaction proceeded analogously. After the initial exotherm the reaction mixture turned brown and finally a ruddy-orange before lithium chloride salts precipitated and the mixture cleared. Work-up yielded an oligomer with a mulecular weight of 550–1000, a refractive index of 1.547 at 25 degrees C., and exhibited UV max absorption at 235, 250, 258, 275 and 285 nm.

EXAMPLE 7

Under conditions discussed in Example 3, the oligomer of Example 6 was treated with sodium. The solid polymer had a molecular weight about 2500–4000. The refractive index was 1.5586, and exhibited UV max absorption similar to Example 6 at 235, 250, 258, 275 and 285 nm.

One of the significant properties of silane-siloxane copolymers is the ability to form photoactive blocks in silicone polymers as shown in Example 8 below.

EXAMPLE 8

A 250 ml flask equipped with a magnetic stirrer and charged with 25 ml of uninhibited (BHT-free) tetrahydrofuan and 6 g of silanol terminated polydimethylsiloxane (1700 M.W.) with about 2.5 weight percent OH. Acryloxypropylmethyldichlorosilane (8 g) was added. The mixture was stirred for 16 hours. Permethylsilane-siloxane oligomer (6 g) from Example 5 was added, followed by 10 ml of a 50:50 mixture of THF and water. After 20 minutes the mixture was poured into a separatory funnel and washed three times with water. The polymer was stripped under vacuum at 40 degrees C. The resulting polymer gave the expected IR of a (permethylsilane-disiloxane)-(acryloxypropylmethylsiloxane)-(dimethylsiloxane) block polymer. Viscosity of the block polymer was 100–200 ctsk, and refractive index was 1.448 at 23 degrees C.

The liquid polymer was coated on glass slides and exposed in air to a Fusion D 200 watt ultraviolet light source for about 1 second. The material cured to a film. The refractive index of the film was 1.454.

Repeating Example 8 without the addition of acryloxypropylmethyldichlorosilane would yield a simple, as opposed to modified, block copolymer.

EXAMPLE 9

Polydimethylsilane-dimethylsiloxane Copolmyer Hydride Substituted

A four neck 12 L flask equipped with overhead stirrer, condensor and pot thermometer is blanketed with nitrogen. The flask is charged with 8 liters of dry tetrahydrofuran and 81.5 g. of potassium sticks. The potassium is previously washed with hexane to remove mineral oil. With full agitation, high molecular weight, insoluble polydimethysilane is added and dispersed in five 100 g. portions. The slurry is heated to reflux. After several hours the potassium melts and forms small spheres. Over the next 3–4 days the mixture turns amber and the polymer dissolves. The mixture is refluxed 2–3 weeks. It is then allowed to cool. The mixture is decanted from potassium salts and filtered through glass-wool and then dissolved in an equal volume of hexane. The solution is washed thoroughly with water until most tetrahydrofuran is extracted. A small amount of solid polymer precipitates. This is removed by filtration. The hexane is stripped under vaccum. The resulting liquid polymer has a refractive index of 1.5361 @ 22 degrees C. The infra-red showed evidence of introduction of hydrogen substitution replacing methyl groups as evidenced by strong absorption at 2055 $cm^{-1}$ GPC indicated MW>1200.

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the appended claims.

I claim:

1. A linear polysilane-siloxane copolymer of the general formula:

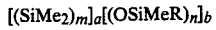

wherein Me is a methyl group, R is lower aklyl or aryl, m=4 to about 30 inclusive, n=1 to about 100 inclusive, a and b are each 1 to about 10 inclusive, and a units alternate with b units.

2. A polysilane-siloxane copolymer according to claim 1 which is a random copolymer wherein n=1 to about 9 inclusive.

3. A polysilane-siloxane copolymer according to claim 1 which is a block copolymer wherein n=about 10 to about 100 inclusive.

4. A polysilane-siloxane copolymer according to claim 1 which is an oligomer.

5. A polysilane-siloxane oligomer according to claim 4 which is photoreactive.

6. A polysilane-siloxane copolymer according to claim 1 wherein the copolymer is modified by the incorporation of acrylate functional pendant groups on some of said siloxanes.

7. A modified linear polysilane-siloxane copolymer of the general formula:

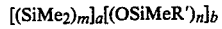

wherein Me is a methyl group, R' alternates between lower alkyl or aryl on some Si atoms and a reactive group on other Si atoms, wherein the reactive group is selecte from the group consisting of acrylate, methacrylate, vinyl, and other unsaturated functional groups, m=4 to about 30 inclusive, n=1 to about 100 inclusive, a and b are each 1 to about 10 inclusive, and a units alternate with b units.

8. A modified polysilane-siloxane copolymer according to claim 7 which is a block copolymer wherein n=about 10 to about 100 inclusive.

9. A method of preparing high molecular weight linear polysilane-siloxane random copolymers of claim 2 comprising condensing a halogen terminated polysilane-siloxane oligomer by sodium condensation.

10. A method according to claim 9 wherein said halogen terminated polysilane-siloxane is prepared by condensing a halogenated disiloxane with a dichlorosilane by lithium condensation.

11. A method of preparing high molecular weight polysilane-siloxane random copolymers of claim 2 comprising hydrolyzing a halogen terminated polysilane-siloxane oligomer.

12. A method according to claim 11 wherein said halogen terminated polysilane-siloxane oligomer is prepared by condensing a halogenated disiloxane with a dichlorosilane by lithium condensation.

13. A method of preparing polysilane-siloxane block copolymers of claim 3 comprising reacting a halogen terminated permethylsilane oligomer with a silanol terminated organofunctional siloxane.

14. A method according to claim 13 wherein said siloxane is a silanol terminated polydimethylsiloxane.

15. A method of preparing modified polysilane-siloxane copolymers of claim 7 comprising reacting a halogen terminated permethylsilane-siloxane oligomer with a silanol terminated organofunctional siloxane and a halogenated organofunctional silane.

16. A method according to claim 15 wherein the organofunctionality of said silane includes at least one acrylate or methacrylate group per silicon atom.

17. A method according to claim 16 wherein said silane is acryloxypropylmethyldichlorosilane.

18. A method according to claim 15 wherein said siloxane is silanol terminated polydimethylsiloxane.

* * * * *

UNITED STATES PATENT AND TRADEMARK OFFICE
CERTIFICATE OF CORRECTION

PATENT NO. : 4,626,583

DATED : December 2, 1986

INVENTOR(S) : Barry C. Arkles

It is certified that error appears in the above-identified patent and that said Letters Patent is hereby corrected as shown below:

Column 5, line 10, equation (IV), change
"$Cl(SiMe_2)_m(OSiMe_2)_nCl$" to --$x[Cl(SiMe_2)_m(OSiMe_2)_nCl]$--.

Column 5, line 18, equation (V), change
"$Cl(SiMe_2)_m(OSiMe_2)_nCl$" to --$x[Cl(SiMe_2)_m(OSiMe_2)_nCl]$--.

Column 5, line 62, equation (IX), change
"$HO[(SiMe_2)_m]_a[(OSiMe_2)_n]_bOH$" to --$HO[(SiMe_2)_mO]H$--.

Column 10, line 7, claim 9, change "high" to --low--.

Signed and Sealed this

Twenty-fourth Day of December, 1991

*Attest:*

HARRY F. MANBECK, JR.

*Attesting Officer*      *Commissioner of Patents and Trademarks*